United States Patent [19]
Schoenhenz

[11] 3,805,925
[45] Apr. 23, 1974

[54] CALIPER AND MOUNTING MEANS FOR A DISC BRAKE

[75] Inventor: Daniel Schoenhenz, Epinay, France

[73] Assignee: Societe Anonyme D.B.A., Paris, France

[22] Filed: Dec. 14, 1972

[21] Appl. No.: 315,057

[52] U.S. Cl. .............................................. 188/73.3
[51] Int. Cl. ........................................... F16d 65/02
[58] Field of Search ................ 188/72.4, 73.3, 73.6; 287/103 A

[56] References Cited
UNITED STATES PATENTS

| | | | |
|---|---|---|---|
| 3,677,372 | 7/1972 | Burnett | 188/73.3 |
| 3,522,866 | 8/1970 | Habersack | 188/73.6 |
| 2,161,501 | 6/1939 | Blackman | 287/103 A |
| 3,374,866 | 3/1968 | Miles | 188/73.3 X |

FOREIGN PATENTS OR APPLICATIONS

| | | | |
|---|---|---|---|
| 1,079,911 | 8/1967 | Great Britain | 188/73.3 |
| 984,103 | 2/1951 | France | 287/103 A |
| 1,280,296 | 11/1961 | France | 188/73.6 |

Primary Examiner—George E. A. Halvosa
Attorney, Agent, or Firm—Ken C. Decker; William N. Antonis

[57] ABSTRACT

A disc brake comprising a sliding caliper straddling the disc and supported on two axially extending pins mounted in a fixed support, two pressure pads anchored on the fixed support so as to co-operate with the opposite sides of the disc, one pad being adjacent to an inside surface of one leg of the caliper, the other pad being operated by the piston of a brake cylinder mounted in the other leg of the caliper, the pins traversing mutually opposite bores axially provided in the support and in the caliper to guide the sliding movement of the caliper, wherein said bores are open along their length to have a substantially C-shaped cross-section, so that the pins can be introduced into the bores through the opening, locking means being also provided, so that the pins cannot thereafter freely escape from the bores by passing through the opening.

6 Claims, 10 Drawing Figures

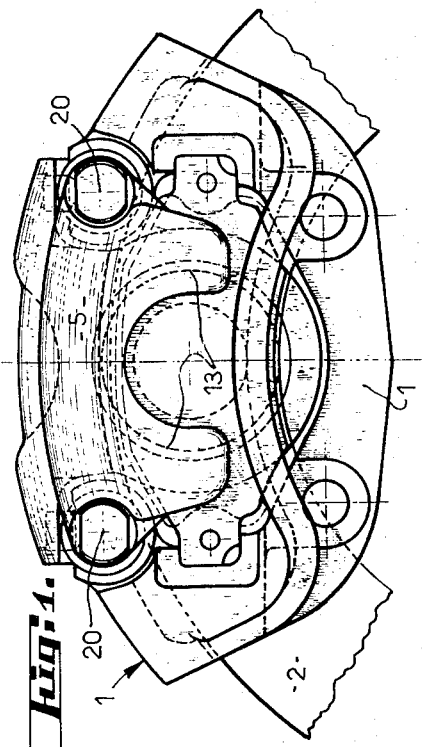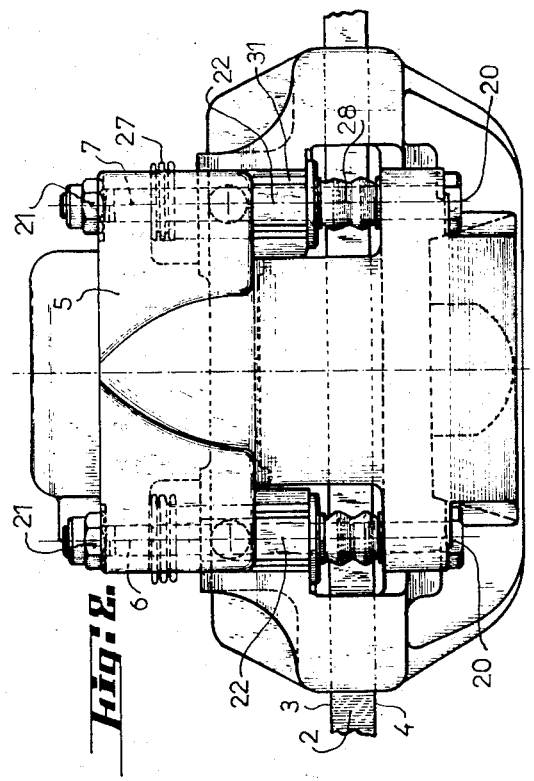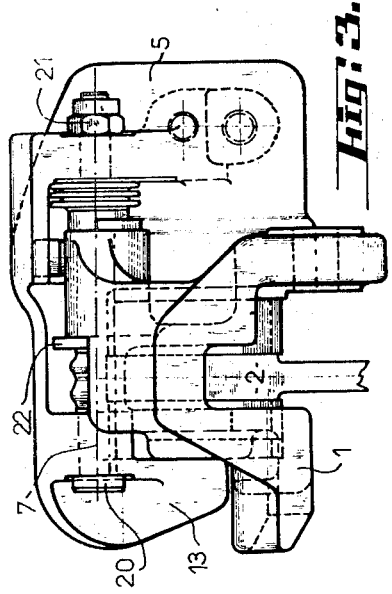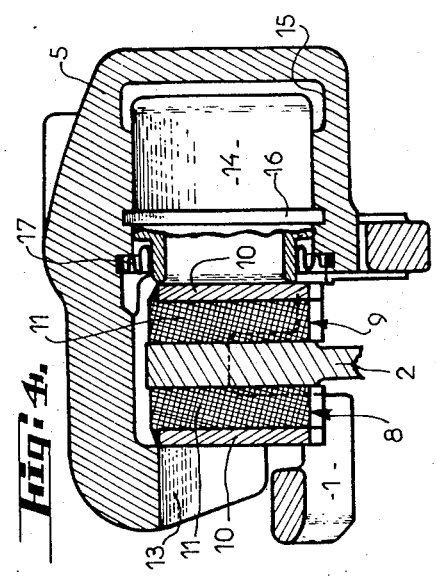

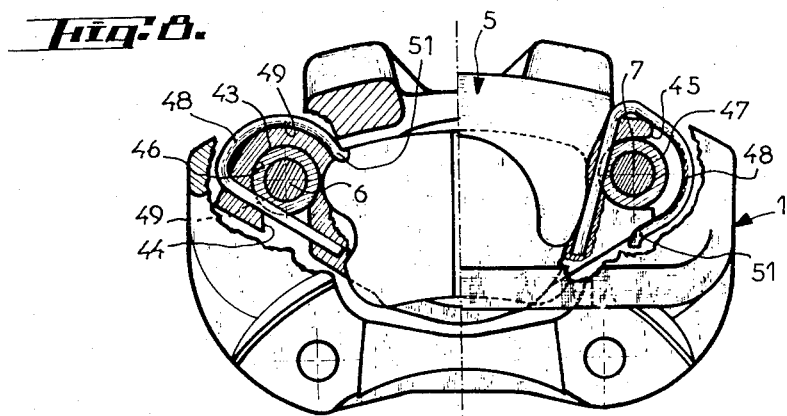
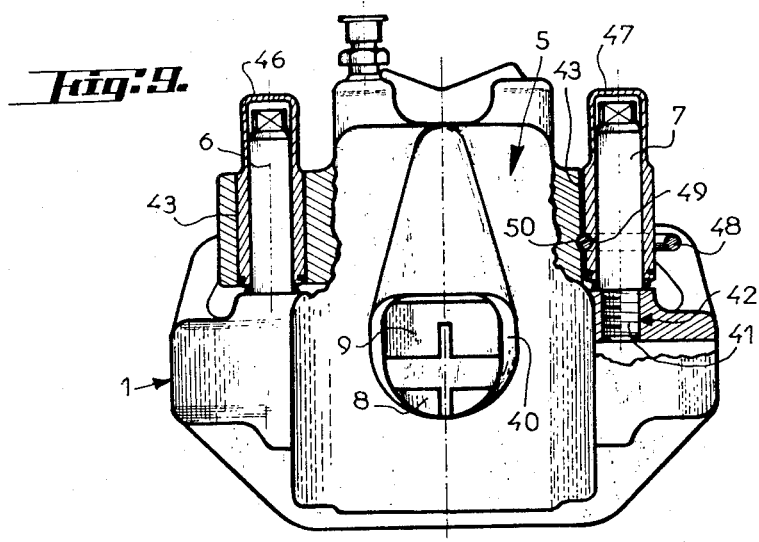
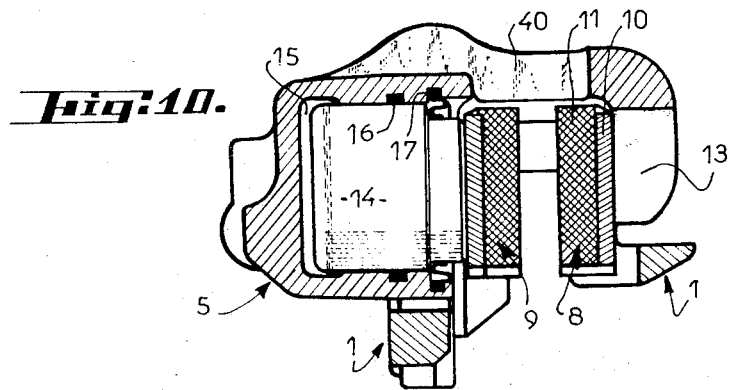

CALIPER AND MOUNTING MEANS FOR A DISC BRAKE

The present invention relates to a disc brake for vehicles, of the type generally termed a "floating-caliper disc brake" to distinguish it from fixed-caliper disc brakes.

This type of disc brake, generally mounted on motor vehicles, is well known and has a fixed support in which the disc moves, a housing or caliper straddling the disc and slidably mounted on the support, pressure pads which are pressed on to each side of the disc, one by the piston of a brake cylinder contained in the housing and the other by the housing itself, which forms a reaction-transmitting element. The housing is generally slidably mounted on the fixed support by means of pins or columns which are fixed to the support or housing and are perpendicular to the plane of the disc.

This arrangement has disadvantages, chiefly as regards dismantling and re-assembly of the brake when, for example, the pressure pads require to be changed, inspected or dusted. The way in which the housing or caliper is mounted on the support is such that the means fixing it to the support must be detached completely and the housing or fixed support must then be moved away in order to give access to the pressure pads. These dismantling and re-assembly operations are therefore lengthy and often difficult and, as a direct consequence, expensive.

The invention enables these disadvantages to be overcome. To this end it consists of a disc brake comprising a housing in the form of a caliper straddling the disc and forming a floating reaction-transmitting element supported so as to permit an axial sliding movement thereof perpendicular to the plane of the disc by two pins mounted in a fixed support, two pressure pads anchored on the fixed support so as to co-operate with the opposite sides of the disc, one pad being mounted adjacent to an inside surface on a first leg of the caliper, the other pad being operated by the piston of a brake cylinder mounted on the opposite inside surface on the second leg of the caliper, the pins traversing mutually opposite bores provided in the support and in the housing to permit and guide the said relative axial sliding movement of the housing, the brake being characterised in that the said bores provided at least in the housing or in the support comprise a gap so that they have a substantially C-shaped cross-section and so that the pins can be introduced into the bores transversely relative to their axes, locking means being also provided so that the pins cannot thereafter freely escape from the bores by passing through the gaps.

As a result of the invention the housing can be removed from or replaced on the fixed support simply by unlocking or locking the pins in the bores.

According to a subsidiary feature of the invention, the locking means comprise a pin portion of reduced width permitting passage of the pin through the gap, and after the pin has been placed in the bore the said portion is shifted, for example, by rotation through 90° and is no longer opposite the gap, so that the pin cannot leave the bore. In this case the portion of reduced width can be brought opposite the gap merely by turning the pin through a quarter turn, and the pin can then leave the bore, releasing the housing from the fixed support.

According to a modification of the invention, the diameter of the pin is less than that of the bore and the locking means comprise a sleeve which is placed over the pin after the bore has been positioned around the pin and which fits into the bore, whereupon a circlip, spring or the like fixes the sleeve in the locked position.

The invention will now be described by way of example with reference to the accompanying drawings in which:

FIG. 1 is a front elevation of a disc brake embodying the invention;

FIG. 2 is a plan view of the disc brake shown in FIG. 1;

FIG. 3 represents a view from the right of the disc brake shown in FIG. 1;

FIG. 4 is a view from the right, partly in section, of the disc brake shown in the preceding figures;

FIG. 8 is a front elevation, half in section and partly cutaway, of a second embodiment of the invention;

FIG. 9 is a plan view, partly cutaway, of the disc brake shown in FIG. 8; and

FIG. 10 is a view from the left, half in section, of the disc brake shown in FIG. 8.

Figure 5:
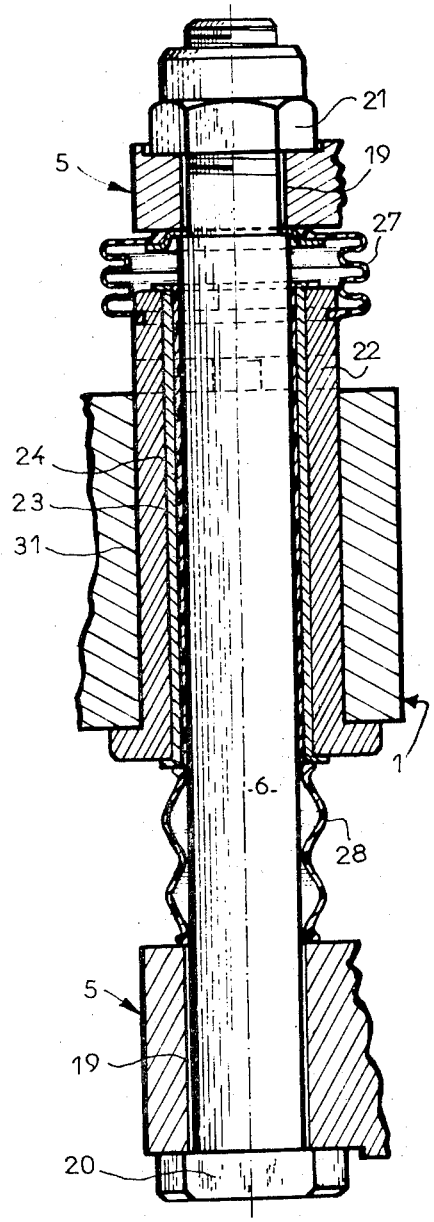
FIG. 5 represents a detail of the invention on a larger scale, partly in section.

In a first disc brake embodying the invention, shown in FIGS. 1 to 4, 1 designates a fixed support in which part of the periphery of a disc or rotor 2 is movable. The disc 2 has opposite annular friction areas 3, 4 and is generally fixed to a vehicle wheel, whereas the fixed support is mounted on a fixed element of the vehicle, for example a journal. As FIGS. 1 to 3 show, the fixed support 1 is as it were astride the disc 2. A housing in the form of a caliper 5 is mounted on the fixed support 1 and straddles the disc 2. The caliper is supported and guided so as to permit axial sliding of it perpendicular to the plane of the disc 2 by two pins or columns 6, 7 which in turn are attached to the fixed support. Two pressure pads 8, 9 best seen in FIGS. 1 and 4, each comprise a backing plate 10 and a brake lining 11 and are anchored on the fixed support 1 by the front edges of their backing plates 10. The pad 8 is placed against an inside surface of one leg 13 of the caliper 5. The other pad 9 is operated by the piston 14 of a brake cylinder mounted in a cavity 15 in the housing 5, the cavity also containing the brake fluid and having on its periphery an annular seal 16 mounted around the piston 14. At the open end of the cavity there is an annular bellows-type seal 17, placed around the piston 14 and intended to prevent duct from the road from entering the cavity. The liquid introduced under pressure into the cavity 15 is therefore kept in the cavity by the seal 16 and acts on the piston 14, moving it to the left in FIG. 4. At the same time the housing or caliper 5, which is slidable on the fixed support 1 by means of the pins 6, 7, forms a reaction-transmitting element and so moves to the right in FIG. 4. The pressure pads 8, 9 are therefore clamped on to the disc sides 3 and 4 together.

The pins 6, 7 on which the caliper 5 slides are screwed completely on to the caliper, which they traverse at right angles to the plane of the disc through bores 19 (FIG. 5). In the embodiment shown in FIGS. 2, 3 and 5, each pin 6 or 7 preferably has a head 20 by which it bears on one side of the caliper 5. A nut 21 screwed on to the other end of the pin 6, 7 fixes the pin on to the caliper. Each pin is provided with a device (FIG. 5) comprising an outer sleeve 22. Between the sleeve 22 and pin 6 or 7 lie, firstly, an inner sleeve 23 of anti-friction material and, secondly, a thin sleeve 24, for example of aluminium, which is then swaged on to the pin 22 so that its ends 25, 26 are slightly flattened on to the ends of the sleeve 22. The sleeve 24 serves to fix the sleeve 22 on to the pin 6 or 7, and the sleeve 23 inserted between the fixing sleeve 24 and the pin serves to prevent metal/metal contact and therefore jamming of the pin.

Figure 6:
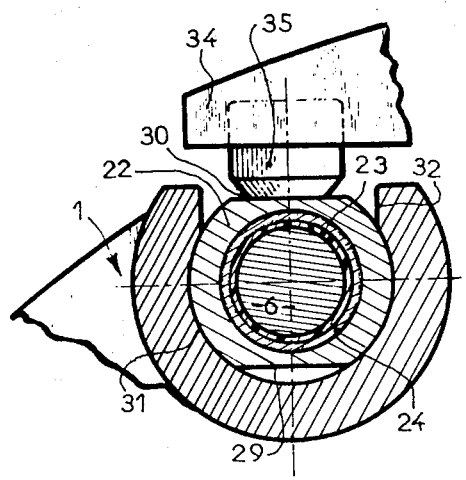
FIGS. 6 and 7 are sections illustrating operation of the device shown in FIG. 5.
Figure 7:
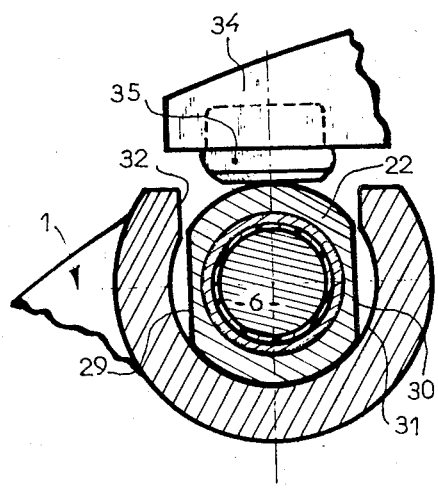

Cylindrical bellows seals 27, 28 are placed round the pin at each end of the sleeve 22, between the sleeve and each end of the caliper 5. In accordance with the invention the outside surface of the outer sleeve 22 has two diametrically opposite flat portions 29, 30 extending over its entire length (FIGS. 6, 7).

The pins 6, 7 provided with the device just described are mountd on the caliper 5 and fixed by means of nuts 21. The fixed support 1 contains two bores 31, one for each of the pins 6, 7 for the caliper 5. Each bore 31 is provided with a vertical gap or slot 32 whose width is slightly greater than the distance between the two flat portions 29, 30 of each sleeve 22. These gaps 32 enable the pins 6, 7 to be introduced into the bores 31 in the fixed support when the flat portions 29, 30 of the outer sleeve 22 are parallel to the vertical edges of the gaps 32 (FIG. 7). Since the gap width is less than the diameter of the sleeve 22, merely turning the sleeve through a quarter turn (so that the flat portions 29, 30 are horizontal) causes the pins 6, 7 to be held in the bores 31 by the sleeves 22 (FIG. 6). The housing or caliper 5 is now fixed to the fixed support 1 and can slide in the bores 31 in the support along the pins 6, 7.

The invention also provides a fixing device for the sleeve 22, comprising a resilient (for example rubber) element 35 mounted on a projection 34 of the caliper 5 above the sleeve 22. The element 35 normally rests on one of the flat portions 29, 30 of the sleeve 22 as shown in FIG. 6 and is compressed resiliently when the sleeve 22 is turned as shown in FIG. 7 in order to remove or replace the caliper 5.

The operations of putting the caliper 5 on to and taking it off the fixed support 1 can be carried out very easily, thanks to the device just described. When the caliper is on the fixed support, each sleeve 22 is merely turned through a quarter turn by means of an appropriate tool, disengaging the caliper 5 from the support and giving direct access to the pressure pads. The caliper is equally easy to replace; it is placed above the support so that the two sleeves 22 mounted on the pins 6, 7 are above the gaps 32 of the bores 31, and the sleeves 22 are then inserted in the bores 31 and turned through 90° so that they are held in the bores. The resilient elements 35 then expand resiliently and holds the sleeves 22 in position.

A second embodiment of the device for fixing the caliper to the support is illustrated in FIGS. 8 to 10. In the description of the second embodiment elements identical to those in the first embodiment bear identical reference numerals.

The disc brake illustrated in FIGS. 8 to 10 comprises a fixed support 1 astride a disc or rotor (not shown), and a housing in the form of a caliper 5 which straddles the disc or rotor. Two pressure pads 8, 9, comprising a backing plate 10 and brake lining 11, are anchored on the fixed support by means of their backing plates. The pad 8 normally bears on an inside surface of one leg of the caliper 5, and the other pad 9 is operated by the piston 14 of a brake cylinder housed inside a cavity 15 in the caliper 5. As in the preceding embodiment seals 16, 17 are provided on the internal periphery of the cavity 15. The top of the caliper 5 is advantageously provided with an aperture 40 situated above the disc and pressure pads 8, 9. The aperture serves in particular to show whether the brake linings on the pads 8, 9 are worn or in good condition.

In the second embodiment the caliper is fixed to the support 1 by means of the following device.

In this embodiment the pins 6, 7 are screwed by one end 41 into a threaded bore 42 in the fixed support and remain on this support permanently.

The caliper 5 contains two bores 43 opposite the bores 42 in the fixed support, the pins 6 and 7 being inserted in the bores 43 when the caliper is mounted on the support. Each of the bores 43 is provided with a gap. One gap 44 is vertical and faces downwards (left hand caliper portion in FIG. 8); the other gap 45 is horizontal and faces out of the caliper (right hand caliper portion in FIG. 8).

As FIGS. 8 and 9 show, each of the pins 6, 7 is provided with a cylindrical sleeve 46, 47 respectively, closed at one end and placed over the corresponding pin. Each sleeve is fixed to the caliper 5 by elements such as, for example, circlips 48 or the like, which are housed in grooves 49 or the like provided on each sleeve 46, 47 and in corresponding grooves 50 provided on each side of the caliper in the peripheries of the bores 43. The circlips 48 or the like are therefore supported by one end 51 on the caliper 5 and then run along the grooves 49, 50 in order to fix the sleeves 46, 47 to the caliper 5. In this case the caliper 5 slides on the pins 6, 7 by means of the sleeves 46, 47, and the pins are fixed permanently to the support 1.

The operation of putting the caliper on the fixed support is carried out as follows.

The two pins 6, 7 are already screwed on to the fixed support 1. The sleeve 47 is placed round the pin 7, and the inclined caliper 5 is brought over the fixed support so as to engage the gap 45 on the sleeve 47. The gap 44 is therefore above the pin 6 which is not yet engaged in the bore 43. The caliper 5 is then lowered on to the support and at the same time turned on the pin 7, with the result that the pin 6 passes through the vertical gap 44 to engage in the bore 43. The sleeve 46 is placed over the pin 6 in the bore 43. Lastly, the circlips 48 are threaded into the grooves 49, 50, one circlip passing round the sleeve 46 and the other round the sleeve 47.

To take off the caliper 5, the two circlips 48 and then the sleeve 46 are removed. The caliper is then pivoted upwards around the sleeve 47 and pin 7 to disengage it from the pin 6, whereupon it is pulled upwards to disengage it from the pin 7. In this case also the operations of putting on and taking off the caliper are very simple and quick.

It will be clear from the above description that the first embodiment, shown in FIGS. 1 to 7, relates to a disc brake in which the caliper 5 is fixed to pins 6 and 7 which slide perpendicularly relative to the plane of the disc in bores 31 in the fixed support and which are locked and fixed in the bores by means of sleeves 22 and rubber elements 35. In the second embodiment, shown in FIGS. 8 to 10, the caliper 5 is fixed to sleeves 46, 47 by circlips 48 and the sleeves slide perpendicularly relative to the plane of the disc on fixed pins 6, 7 mounted on the fixed support.

Obviously the means just described can be combined in a single disc brake without exceeding the scope of the invention.

For example, a disc brake embodying the invention might have a pin 6 fixed to the caliper as in the first embodiment, and a pin 7 fixed to the fixed support as in the second embodiment. Alternatively, in a variant, both pins might, like the pin 6 in the second embodiment, be fixed to the fixed support and housed in two bores in the caliper having parallel gaps 44. The means for fixing the pins in the bores can also be combined and interchanged.

What is claimed is:

1. In a brake:
   a rotor having a pair of friction faces;
   a pair of friction elements, one of said elements being positioned adjacent each of said friction faces;
   a non-rotating torque member mounted adjacent said rotor;
   a caliper member straddling said rotor and engaging each of said friction elements, said caliper member including means for urging each of said friction elements into braking engagement with their corresponding friction faces when a brake application is effected;
   means slidably mounting said caliper member on said torque member for movement transverse to said friction faces;
   said slidable mounting means including pin means carried by one of said members, and bore means defined on the other member having a substantially C-shaped cross section defining a gap receiving said pin means;
   said pin means including a rod-like element secured to said one member and extending transverse to said friction faces, and a sleeve embracing said element and movable with respect thereto, said sleeve being movable from a first position permitting movement of said rod-like element through said gap to a second position preventing movement of said rod-like element through said gap; and
   locking means preventing movement of said sleeve when the latter is disposed in said second position.

2. The invention of claim 1:
   the width of said gap being less than the diameter of said sleeve.

3. The invention of claim 1:
   said sleeve being substantially cylindrical but having a pair of diametrically opposed flats, the diameter of said sleeve being greater than the width of said gap but the distance between said flats being less than the width of said gap, said sleeve being rotatable about said rod-like element from said first position, wherein said flats are aligned with said gap, to said second position, wherein said flats are not aligned with said gap to prevent withdrawal of said pin means from said bore means.

4. The invention of claim 3:
   said locking means including resilient means disposed between one of said flats and said one member.

5. The inventon of claim 1:
   said sleeve being slidable axially on said rod-like element from a first position, wherein said sleeve is disposed away from the portion of said rod-like elements adapted to be received within said bore to permit movement of said rod-like element through said gap to a second position wherein said sleeve is moved within said bore to prevent withdrawal of said pin means through said gap.

6. The invention of claim 5:
   the outer circumferential surface of said sleeve being provided with grooves:
   said locking means being clips engaging said grooves to interconnect said sleeve with one of said members.

* * * * *